(12) United States Patent
Williams et al.

(10) Patent No.: US 12,481,667 B2
(45) Date of Patent: Nov. 25, 2025

(54) SYSTEMS AND PROCESSES FOR CONTEXTUALIZED ENTITY RESOLUTION AND SENTIMENT ANALYSIS IN ADVERSE MEDIA SCREENING

(71) Applicant: Vital4Data, LLC, Marietta, GA (US)

(72) Inventors: Kellan Williams, Granville, OH (US); Amy Barbieri, Atlanta, GA (US); Scott Stafford, Marietta, GA (US); Michael Franks, Dallas, GA (US)

(73) Assignee: Vital4Data, LLC, Marietta, GA (US)

( * ) Notice: Subject to any disclaimer, the term of this patent is extended or adjusted under 35 U.S.C. 154(b) by 0 days.

(21) Appl. No.: 19/052,032

(22) Filed: Feb. 12, 2025

(65) Prior Publication Data
US 2025/0335452 A1  Oct. 30, 2025

Related U.S. Application Data

(60) Provisional application No. 63/640,507, filed on Apr. 30, 2024.

(51) Int. Cl.
| | |
|---|---|
| G06F 16/2457 | (2019.01) |
| G06F 16/93 | (2019.01) |
| G06F 40/295 | (2020.01) |
| G06F 40/30 | (2020.01) |

(52) U.S. Cl.
CPC ........ G06F 16/24578 (2019.01); G06F 16/93 (2019.01); G06F 40/295 (2020.01); G06F 40/30 (2020.01)

(58) Field of Classification Search
CPC ... G06F 16/24578; G06F 16/93; G06F 40/295
See application file for complete search history.

(56) References Cited

U.S. PATENT DOCUMENTS

| | | | |
|---|---|---|---|
| 10,394,830 B1* | 8/2019 | Blair-Goldensohn | ...................... G06F 16/9535 |
| 2011/0225174 A1* | 9/2011 | Artzt | ...................... G06Q 30/02 707/750 |
| 2021/0026835 A1* | 1/2021 | Pai | ........................ G06F 40/169 |
| 2023/0135031 A1* | 5/2023 | Halliwell | ............... G06Q 40/03 705/38 |
| 2024/0004938 A1* | 1/2024 | Shiffman | ................ G06F 16/93 |
| 2025/0029129 A1* | 1/2025 | Mallya Kasaragod | ...................... G06Q 30/0205 |

\* cited by examiner

*Primary Examiner* — Hau H Hoang
(74) *Attorney, Agent, or Firm* — Bradley Arant Boult Cummings LLP; Daniel E. Sineway, Esq.

(57) ABSTRACT

An adverse media screening system for automatically processing and analyzing vast amounts of unstructured data to provide accurate, contextually relevant adverse media screening may utilize one or more computing devices equipped with processors to implement advanced machine learning and natural language processing models. These models may assess the context and sentiment associated with entities mentioned in various media sources, enhancing the specificity and accuracy of screening processes.

20 Claims, 6 Drawing Sheets

SYSTEMS AND PROCESSES FOR CONTEXTUALIZED ENTITY RESOLUTION AND SENTIMENT ANALYSIS IN ADVERSE MEDIA SCREENING

CROSS-REFERENCE TO RELATED APPLICATIONS

This application claims the benefit of, and priority to, U.S. Provisional Patent Application No. 63/640,507, filed Apr. 30, 2024, and entitled "SYSTEMS AND PROCESSES FOR ENTITY RESOLUTION AND SENTIMENT ANALYSIS IN ADVERSE MEDIA SCREENING," the disclosure of which is incorporated by reference in its entirety as if the same was fully set forth herein.

TECHNICAL FIELD

The present disclosure generally relates to systems and methods for automated adverse media screening, particularly the utilization of contextualized entity resolution and sentiment analysis within large-scale data processing environments.

BACKGROUND

With the proliferation of digital media, organizations increasingly rely on screening tools to monitor and assess the risk associated with individuals and businesses. These screening tools are crucial in contexts such as background checks or employment screening, where understanding the history and integrity of candidates can mitigate risks and enhance organizational trust and safety. Traditional screening tools often involve keyword-based searches that identify potential adverse media. However, such tools frequently yield a high volume of irrelevant results, or false positives, due to the lack of contextual understanding in the search methodology.

Moreover, the expansion of global anti-money laundering (AML) regulations and the increasing need for thorough Know Your Customer (KYC) processes have underscored the requirement for more sophisticated screening solutions. The effectiveness of compliance programs hinges on the ability to accurately identify and evaluate adverse media reports relevant to the subjects under scrutiny. The substantial manual effort involved in reviewing and validating the relevance of search results poses a significant challenge in terms of resource allocation and operational efficiency.

Furthermore, the dynamic nature of language and the subtleties of sentiment in written content present additional complexities. Traditional systems are typically ill-equipped to interpret the nuances of sentiment, especially when a subject's mention in the media does not pertain to the adverse context being reported. This limitation has prompted a need for advanced solutions capable of discerning the sentiment associated with entities in a manner that accurately reflects the context in which they are discussed.

Accordingly, there is an unresolved need for systems and methods that can automatically process and analyze vast amounts of unstructured data to provide accurate, contextually relevant adverse media screening.

This background information is provided to reveal information believed by the applicant to be of possible relevance. No admission is necessarily intended, nor should be construed, that any of the preceding information constitutes prior art.

SUMMARY

Briefly described, and in various aspects, the present disclosure generally relates to data analytics, particularly in the context of compliance and risk management. Moreover, the present disclosure is particularly relevant to systems and methods for automatically processing and analyzing vast amounts of unstructured data to provide accurate, contextually relevant adverse media screening. These systems and methods may address challenges posed by vast amount of data generated daily that potentially contains information pertinent to the reputational and regulatory risk associated with individuals and entities.

According to some aspects, computational linguistics, data science, and artificial intelligence may be combined to analyze the sentiment and context associated with entities mentioned in adverse media, thereby improving the specificity and accuracy of screening processes. Through the deployment of customized machine learning algorithms and natural language processing techniques that can discern the semantic relationships and sentiment connotations surrounding named entities in textual data, aspects of the disclosure may significantly minimize the rate of false positives compared to traditional keyword-based searches. Moreover, manual effort and time required for compliance personnel to verify and investigate potential adverse findings may be minimized. This efficiency gain may translate into operational cost savings and enable a faster response to potential compliance threats.

Furthermore, aspects of the disclosure may enhance the precision of risk assessments by delivering insights that, relative to conventional screening tools, are more aligned with the true risk profile of the subjects being screened. This precision may be particularly advantageous for financial institutions, regulatory bodies, and other entities engaged in due diligence and background checks, where accuracy and timeliness are of paramount importance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

Reference will now be made to the accompanying drawings, which are not necessarily drawn to scale.

Figure 1:
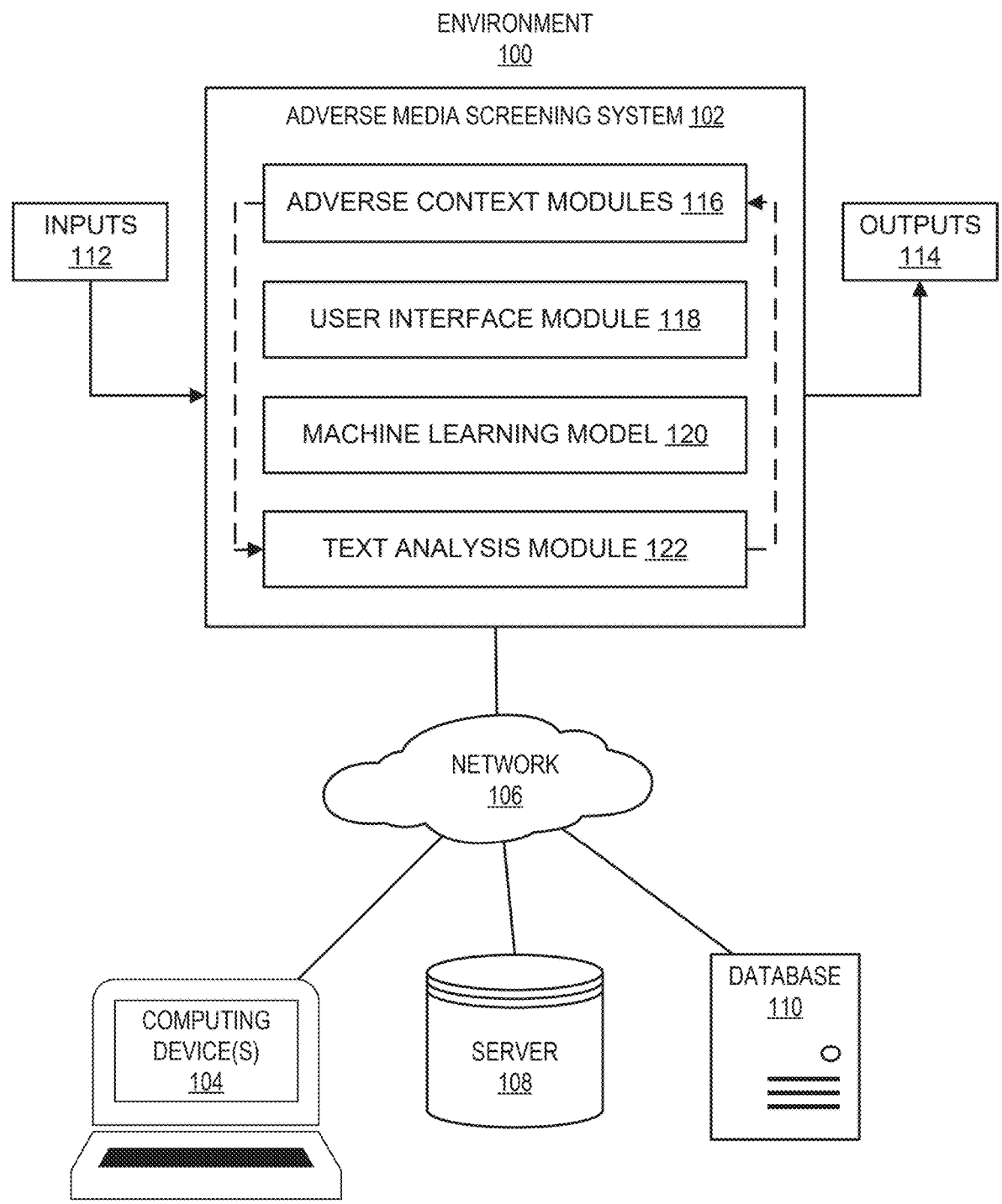
FIG. 1 illustrates an example of an environment for an adverse media screening system.

In accordance with common practice, the various features illustrated in the drawings may not be drawn to scale. Accordingly, the dimensions of the various features may be arbitrarily expanded or reduced for clarity. In addition, some of the drawings may not depict all of the components of a

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Referring now to the figures, for the purposes of example and explanation of the processes and components of the disclosed systems and methods, reference is made to FIG. 1, which illustrates an environment 100 for an adverse media screening system 102 for contextualized entity resolution and sentiment analysis in adverse media screening. The adverse media screening system 102 may automate processing of vast amounts of unstructured data from numerous media sources, identifying and analyzing entities and the sentiment of content surrounding these entities to determine their relevance to adverse media.

The adverse media screening system 102 may perform comprehensive analyses of textual elements to provide a refined adverse media screening by applying machine learning models and/or natural language processing models. One or more machine learning models and/or natural language processing models may evaluate the context in which entities are referenced (e.g., adverse mentions or concepts that are associated with the entities). Moreover, the one or more machine learning models and/or natural language processing models may associate sentiments with entities to determine their connection to potential adverse media. For example, if a news article mentions an individual in the context of a lawsuit for financial misconduct, the adverse media screening system 102 may identify this as an adverse mention by analyzing the surrounding text and concepts like 'lawsuit' and 'financial misconduct'. This identification may enable the adverse media screening system 102 to accurately categorize the mention as adverse, providing insights for compliance and risk assessments.

Adverse media screening system 102 may comprise one or more adverse context modules 116, each of which may be designed to execute specialized functions associated with the adverse media screening process. These functions may include, but are not limited to, the identification of entities such as individuals, organizations, or specific events within textual data streams, assessing the sentiment associated with these entities, determining the context of mentions in the discourse (e.g., identifying adverse mentions or concepts that are associated with the entities), and/or assigning relevance scores to signify the degree of association with adverse content.

One or more of the adverse context modules 116 may utilize an intricate set of predefined linguistic rules that may recognize patterns, syntax, and terminology associated with adverse media. These rules may be derived from extensive analysis of language usage within known adverse media contexts and may discern between benign and potentially adverse mentions of entities. The one or more adverse context modules 116 may leverage dynamically learned patterns, which may be determined by processing and analyzing large datasets (e.g., labeled to indicate varying degrees of adverseness). Through machine learning processes, adverse context modules 116 may evolve and adapt their pattern recognition capabilities, enhancing their accuracy over time as more data is ingested and analyzed.

Moreover, the adverse context modules 116 may utilize natural language processing (NLP) models to parse and analyze text in a manner that closely mimics human linguistic understanding. By employing techniques such as tokenization, part-of-speech tagging, and named entity recognition, the NLP models may dissect complex textual data streams. For example, a breakdown provided by the NLP models may identify key nouns, verbs, and adjectives that frequently occur in adverse contexts. Moreover, NLP may be used to extract semantic relationships between words, providing a deeper insight into the context within which entities are mentioned, such as distinguishing between a company's "award-winning" achievements and its "fraudulent" activities, e.g., aligning analysis with nuanced real-world usage of language.

According to some aspects, the adverse context modules 116 may use text link analysis extraction to refine data contextualization by examining connections and correlations between different textual elements (e.g., as identified by the NLP models). The text link analysis extraction may include constructing a network of text-based links that map, based on linguistic patterns and the proximity of terms, interrelations within the text between different entities and concepts. For example, if an individual's name appears frequently near terms such as "investigation" or "allegation," the text link analysis may flag the pattern as potentially adverse. The text link analysis may enhance the granularity of the screening process, enabling identification of direct mentions of entities in adverse contexts and/or inferring broader context-based associations that may indicate indirect risks.

Moreover, a classification machine learning model may be utilized by the adverse context modules 116 to optimize the effectiveness of one or more of the NLP and/or text link analysis models. The classification machine learning model may analyze the outcomes of the NLP and text linking to determine the efficacy of different linguistic rules and patterns in predicting adverse content. By training on datasets labeled with varying degrees of adverseness, the machine leaning model may learn to assign appropriate weights to different linguistic features and patterns, thereby refining the rule set. The classification machine learning model may continuously evaluate the performance of these rules against new data, adapting them to better address emerging language trends and terminologies found in adverse media. This ongoing learning and adaptation process may ensure that the system remains up-to-date and accurate in its ability to detect and analyze adverse media references, significantly enhancing the operational efficiency and reliability of the media screening process.

To ensure continuous and real-time assessment of data, the adverse context modules 116 may employ specialized algorithms capable of handling the voluminous flow of information characteristic of big data environments. These algorithms may be optimized for speed and accuracy, enabling the adverse media screening system 102 to swiftly sift through and analyze vast repositories of unstructured data (e.g., ranging from online news articles and social media posts to corporate filings and public records) for potential adverse media content.

Upon detection of content that may represent an adverse media reference, the one or more adverse context modules 116 may perform a multi-tiered categorization and scoring process. The one or more adverse context modules 116 may assess various attributes of the content, such as the presence of specific adverse keywords, the sentiment of the surrounding text, the proximity of the entity to these indicators, and/or the overall context derived from the adjacent content. Moreover, the one or more adverse context modules 116 may assign relevance scores that quantify the association of each entity with adverse media. The relevance scores may reflect different levels of risk or concern.

The one or more adverse context modules 116 may obviate the need for extensive manual review by compliance personnel, thereby markedly enhancing operational efficiency. The reduction in manual intervention may accelerate the screening process and minimize human error, leading to more consistent and reliable outcomes. By automating the more laborious elements of the adverse media screening, compliance personnel may focus their expertise on interpreting results, making strategic decisions, and/or performing higher-value investigative tasks that require human insight.

Embodiments of the adverse media screening system 102 may comprise a user interface (UI) module 118 serving as a centralized interactive platform that may enable users to actively engage with the adverse media screening process. The UI module 118 may provide a UI that is accessible through various computing devices 104, offering an intuitive and user-friendly experience that may accommodate users with different levels of technical expertise. Through the UI, users may initiate queries by inputting one or more entities of interest (e.g., names of individuals, organizations, or specific keywords) and may specify the context within which the entities are to be analyzed.

The UI module 118 may provide advanced query options that may allow users to define and refine search parameters, such as date ranges, source types (e.g., news articles, blog posts, legal documents), geographical regions, languages, and other relevant filters. The search parameters may be adjusted to control the breadth and depth of the screening, enabling users to tailor the search process to their specific risk management criteria or compliance requirements. Moreover, the UI module 118 may offer configurable threshold settings that may determine sensitivity and specificity of the adverse media screening. Users may set these thresholds to control the system's tolerance for false positives and negatives, effectively balancing the need for comprehensive screening against the desire to limit irrelevant results. For example, a higher threshold may be set to filter out only the most strongly associated adverse media content, whereas a lower threshold may be chosen to cast a wider net in environments where the cost of missing an adverse media reference is particularly high.

The adverse media screening system 102 may also provide functionality for saving and managing custom search templates, which may streamline the process for recurring screening activities that adhere to consistent parameters. The custom search templates may significantly enhance efficiency for users who conduct regular screenings as part of ongoing compliance or monitoring programs. Upon submission of a query, the system may process the request and present the results in a clear and organized manner. The UI module 118 may display search outcomes with relevant excerpts, sentiment indicators, relevance scores, and/or links to full documents or source materials. The results provided by the UI module 118 may also include tools for sorting, filtering, and visualizing data, such as charts or graphs that illustrate trends or patterns identified during the screening process. Moreover, aspects of the adverse media screening system 102 may facilitate the export of search results into various formats (e.g., CSV, PDF, or proprietary formats) for integration into other systems or for further offline analysis. The UI module 118 may also enable the annotation of results, collaborative review workflows, and the tracking of user interactions for audit and quality assurance purposes.

Accordingly, the UI module 118 may empower users to conduct precise and efficient adverse media screenings, resulting in actionable insights that enhance the decision-making process in risk assessment and compliance operations.

Aspects of the adverse media screening system 102 may comprise a machine learning model 120 trained to analyze patterns to accurately and efficiently identify adverse media content within vast datasets. The machine learning model 120 may adaptively refine its predictions based on new data, enhancing the ability of the machine learning model 120 to provide timely and accurate insights for compliance and risk management purposes. The machine learning model 120 may enhance the NLP models in identifying entities within electronic documents. For example, the machine learning model 120 may use Named Entity Recognition (NER) to extract entities such as individuals, organizations, and locations from unstructured text data. Moreover, the machine learning model 120 may analyze the sentiment associated with each entity mention, determining whether the context is positive, neutral, or negative. Analysis of the sentiment by the machine learning model 120 may facilitate identifying adverse events or benign contexts, reducing false positives associated with adverse screening.

The machine learning model 120 may evaluate the context in which entities are mentioned by analyzing the surrounding text to discern whether the mentions of the entities are related to adverse events or benign contexts. The machine learning model 120 may assign relevance scores to each entity mention based on the context and sentiment analysis. The relevance scores may indicate a strength of the association with adverse media. Moreover, the relevance scores may be used to prioritize criticality of the associations, e.g., where the highest relevance scores are associated with the highest importance.

The adverse context modules 116 may utilize the machine learning model 120 to execute one or more specialized functions, including entity identification, sentiment assessment, and/or context determination. Moreover, the machine learning model 120 may incorporate feedback from compliance officers and other users to continuously improve its predictions. By retraining with new data and adjusting parameters, the machine learning model 120 may adapt to emerging trends and patterns in adverse media content. The machine learning model 120 may process real-time data streams, ensuring that the adverse media screening system 102 remains up-to-date with the latest information and improving responsiveness of the machine leaning model 120 to new adverse media findings.

The training of the machine learning model 120 may begin with collecting a comprehensive dataset comprising labeled examples of adverse and/or benign media mentions. The dataset may be preprocessed to remove noise and standardize text formats. The machine learning model 120 may then be configured with appropriate algorithms, such as NER and sentiment analysis techniques. During the training phase, the machine learning model 120 may learn to identify entities and assess sentiment by iteratively adjusting parameters to minimize prediction errors. Supervised learning techniques, such as backpropagation and gradient descent, may be used to refine the accuracy of the machine learning model 120. The training process can include cross-validation to ensure the generalizability of the machine learning model 120. The machine learning model 120 may be trained with labeled datasets from the database 110 and may use one or more algorithms, such as Support Vector Machines (SVM), random forest, and/or Neural Networks, to confirm sentiment scores. Once trained, the machine learning model 120 may be tested with validation datasets to evaluate the performance of the machine learning model 120. Continuous feedback loops and retraining mechanisms may be established to adapt the machine learning model 120 to new data and evolving patterns in adverse media content, ensuring ongoing accuracy and relevance.

According to some aspects, the adverse media screening system 102 may comprise a text analysis module 122 to enhance the precision and accuracy of output 114. For example, the text analysis module 122 may include one or more text analytic platforms (e.g., Rosette). The text analysis module 122 may be integrated to the adverse media screening system 102 via an Application Programming Interface (API). The text analysis module 122 may provide endpoints for various NLP tasks such as entity recognition, sentiment analysis, text categorization, and/or other NLP tasks. Moreover, the text analysis module 122 may provide deep contextual understanding by analyzing mentions and the context in which the mentions appear. The integration of the text analysis module 122 may enhance the training of the machine learning model 120 by ensuring only relevant adverse mentions are included in the training data. The text analysis module 122 may serve as an additional layer that weeds out potential outliers from output 114. Moreover, the text analytic platform may support a multitude of languages, enabling the analysis of text data from international sources. Thereby the training dataset may be augmented with multilingual data, enhancing the ability of the machine learning model 120 to generalize text data across different languages and global contexts.

The text analysis module 122 may offer several additional functions to enhance the capabilities of the adverse media screening system 102 and support the machine learning model 120. These functions may include advanced language processing features such as entity disambiguation, which may help distinguish between entities with similar names by analyzing contextual clues. The text analysis module 122 may also provide multilingual text analysis, enabling the adverse media screening system 102 to process and understand text in multiple languages, which may facilitate global adverse media screening. The text analysis module 122 may perform relationship extraction, identifying and mapping relationships between entities to uncover hidden connections. Additionally, the text analysis module 122 may offer sentiment trend analysis, tracking changes in sentiment over time to detect emerging risks. The text analysis module 122 may also conduct topic modeling, grouping related documents and identifying prevalent themes within large datasets. These advanced functions may collectively improve the accuracy, efficiency, and comprehensiveness of the adverse media screening system 102, ensuring more reliable risk assessments.

Further, the text analysis module 122 may provide a secondary verification step, where it cross-references the extracted entities against a secondary extraction performed by a different analytical method (e.g., as employed by the adverse context modules 116). This dual-layer verification may be used to confirm the accuracy of the initially extracted entities (e.g., from the adverse context modules 116) and eliminate any outliers. For example, adverse mentions that have been identified by the adverse context modules 116 and are not identified by the text analysis module 122 may be eliminated. This secondary verification process may enhance the reliability of the data and refine the overall screening process by reducing the likelihood of false positives or erroneous adverse mention associations.

Connected to the adverse media screening system 102 may be one or more computing devices 104, each of which may vary widely in their design and application but sharing a common capability to process and analyze data. These computing devices 104 may be employed by compliance officers, risk managers, and/or other personnel engaged in due diligence and background checks to conduct adverse media screenings across various media sources. The one or more computing devices 104 may be interconnected via a network 106, enabling the sharing and transmission of data and analytical results throughout the environment 100. Network 106 may encompass a variety of networking technologies to facilitate the seamless flow of information and ensure the robust operation of adverse media screening system 102.

A server 108 within the environment 100 may operate as a central processing unit and repository for applications and services related to the systems and methods for application of one or more of natural language processing (NLP), machine learning models for sentiment and context analysis, and/or databases for entity recognition. In this capacity, the server 108 may manage the ingestion, processing, and analysis of large volumes of unstructured text data, apply advanced algorithms to determine the presence of entities and sentiments, and assess the context surrounding these entities (e.g., adverse mentions or concepts that are associated with the entities) to identify potential adverse media references.

Upon successful identification and analysis, the server 108 may categorize the data and assign relevance scores, which may be stored and can queried by users through the UI module 118. The relevance scores enable users to ascertain the level of risk or importance of the adverse media references associated with the identified entities. Moreover, server 108 may facilitate continuous improvement of screening accuracy by updating the underlying NLP and machine learning models based on feedback and new data. The server 108 may implement adjustments and refinements to the entity resolution and sentiment analysis processes, ensuring the evolution of the adverse media screening system 102 in alignment with emerging trends and patterns in adverse media content.

Additionally, the server 108 may distribute updates, such as enhanced algorithms, improved linguistic rulesets, and expanded entity databases, to computing devices 104 and other components of the adverse media screening system 102. By centrally managing these updates, the server 108 may ensure the cohesive functioning of the entire system, maintaining the highest levels of performance and accuracy in adverse media screening.

A database 110 may serve as an essential repository for storing and managing data for contextualized entity resolution and sentiment analysis in adverse media screening. The database 110 may adopt various forms to address the complex data management needs inherent to the identification and evaluation of adverse media references. The database 110 may consist of a traditional relational database designed to organize structured data with predefined relationships, facilitating the efficient retrieval of entities, sentiment analyses, and contextual information. Moreover, to manage the vast and heterogeneous unstructured data inherent to adverse media screening, the database 110 may implement a NoSQL model. The NoSQL model may provide flexibility to accommodate various data types and structures, ranging from text documents to logs and reports, allowing for scalable data storage solutions that can handle high-velocity and high-volume data influx. According to some aspects, the database 110 may be cloud-based. This allows for data redundancy and ensures that data is securely stored and accessible from multiple geographic locations. Such a configuration may facilitate seamless access for distributed users and systems, supporting continuous adverse media screening operations.

The database 110 may retain processed information, including identified entities, their associated sentiment scores, and the context within which these entities are mentioned in media sources. Moreover, the database 110 may store the results of relevance scoring, which may indicate the strength of association between entities and adverse media content. Additionally, the database 110 may archive historical search results and user queries, creating a knowledge base that may be used for one or more of trend analysis, pattern recognition, and/or refinement of the system's analytical models. Moreover, the database 110 may contain configuration settings and parameters for the entity resolution and sentiment analysis components of the environment 100, allowing for dynamic adjustment to the operational aspects of the adverse media screening process. By maintaining this extensive dataset, the database 110 may enable the adverse media screening system 102 to evolve by learning from new data and user feedback, thereby progressively enhancing the accuracy and reliability of the adverse media screening.

Inputs 112 into the adverse media screening system 102 may be derived from a broad spectrum of data sources essential for conducting thorough and precise adverse media screening. For example, the inputs 112 may include real-time data streams capturing up-to-the-minute news articles, social media posts, financial reports, online articles, public filings, court transcripts, legal documents, etc., alongside structured and unstructured databases that aggregate historical media content, corporate records, and various compliance lists. Additionally, the inputs 112 may include user-generated queries, such as specific names, keywords, or phrases related to entities of interest. This multifaceted data collection may enable the adverse media screening system 102 to perform a comprehensive scan of available information, ensuring that the adverse media screening is both current and historically aware.

Outputs 114 from the adverse media screening system 102 may include comprehensive results from the adverse media screening process, ensuring that users receive precise and actionable information. The outputs 114 may be tailored to the specific needs of compliance and risk management workflows. For example, detailed reports and analytical summaries may provide users with deep insights into the context and sentiment associated with each of the identified entities. Moreover, the reports may guide strategic decision-making and risk assessments by highlighting potential adverse media connections, enabling organizations to proactively manage and mitigate reputational risks.

Additionally, the outputs 114 may include alerts and notifications to inform users of critical findings. These alerts can be configured to vary in format (e.g., from emails and push notifications to interactive dashboards within the system's user interface) and may convey the urgency and relevance of adverse media findings succinctly. The outputs 114 may allow compliance officers and risk managers to quickly assess and respond to potential risks. The outputs 114 may also include visualization tools that map entities and their connections to adverse media, offering a clear and intuitive understanding of the data relationships. Such visual outputs may simplify complex data sets, making them easily interpretable and actionable. To enhance operational efficiency, these alerts and visualizations may be prioritized based on predefined criteria such as the severity of the adverse sentiment or the relevance score, ensuring that the most significant issues are addressed promptly and effectively.

Figure 2:
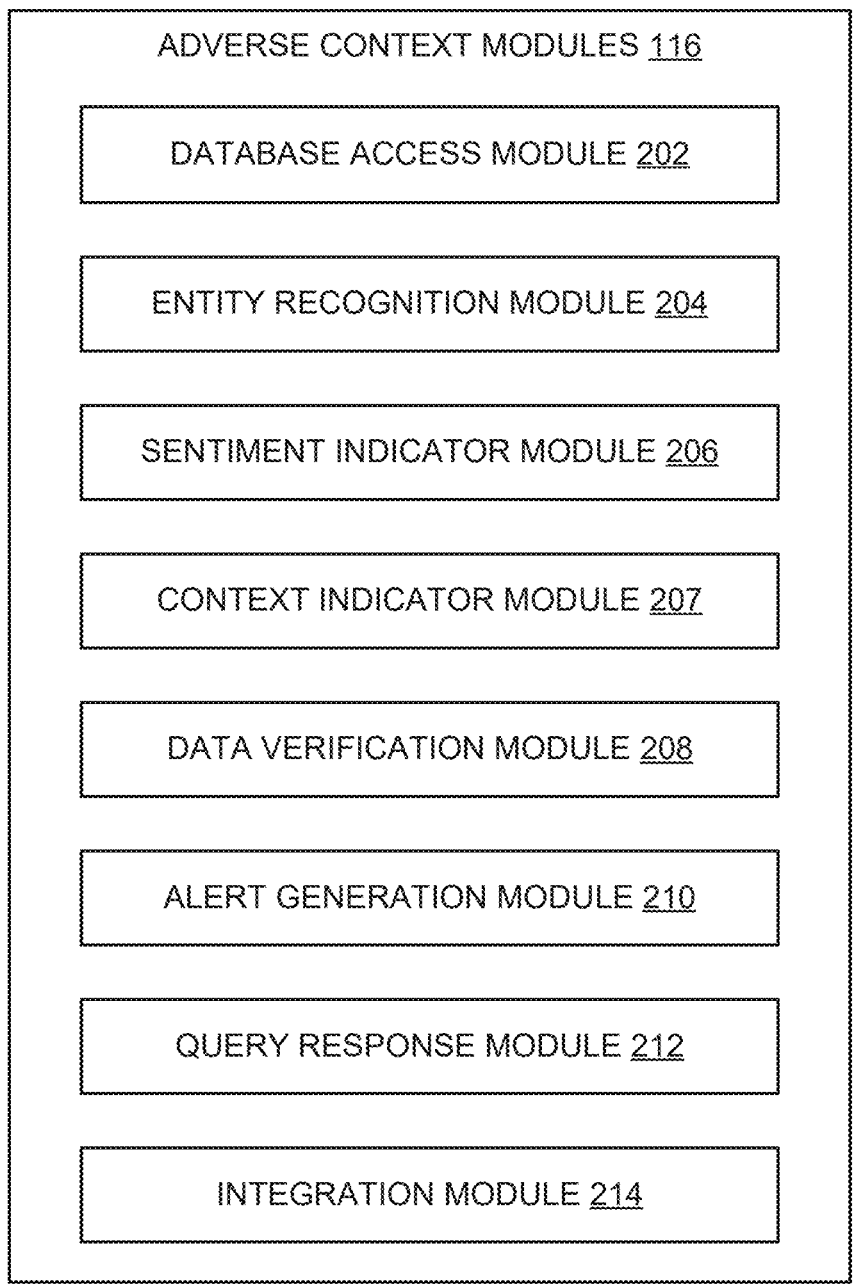
FIG. 2 illustrates an example of adverse context modules.

Referring now to FIG. 2, the adverse context modules 116 may include one or more modules to execute various functions of the process for contextualized entity resolution and sentiment analysis in adverse media screening. Each module may handle specific aspects of the analysis process, leveraging advanced data processing capabilities to enhance efficiency and accuracy. As illustrated in FIG. 2, the adverse context modules 116 may include one or more of a database access module 202, an entity recognition module 204, a sentiment indicator module 206, a context indicator module 207, a data verification module 208, an alert generation module 210, a query response module 212, and/or an integration module 214.

The database access module 202 may provide a gateway for accessing and maintaining a comprehensive database of known entities. This database access module 202 may continuously interface with an array of public and proprietary sources to retrieve and update the entity data, ensuring that the repository of the adverse media screening system 102 reflects the most current information available. The database access module 202 may continuously retrieve and update entity data through scheduled and event-driven updates, ensuring the adverse media screening system 102 always contains the latest information. For example, the database access module 202 may regularly pull data from government public records and integrate updates from subscription-based services such as corporate financial databases. This continuous interface may address the challenges faced by conventional systems of data obsolescence by maintaining the accuracy of compliance and risk management processes.

The database access module 202 may monitor changes in the status or characteristics of entities within a database by continuously tracking updates and modifications to entity records. This may include changes in names, affiliations, legal statuses, and other relevant attributes. By maintaining a dynamic and up-to-date repository, the database access module 202 may ensure that the adverse media screening system 102 has access to the latest information for accurate entity resolution and sentiment analysis. The database access module 202 may integrate seamlessly with the adverse context modules 116, providing real-time data feeds that enhance the system's ability to identify and analyze adverse media mentions. This integration may allow the system to quickly adapt to new information, improving the precision of risk assessments and reducing false positives. Additionally, the database access module 202 can support historical data analysis, enabling the system to detect trends and patterns over time. The historical data analysis can facilitate the proactive risk management and compliance efforts.

The database access module 202 may optimize the efficiency of data retrieval processes by employing caching and indexing techniques that speed up query responses. Caching may involve temporarily storing frequently accessed data in a high-speed storage layer, allowing the system to quickly retrieve this data without repeatedly querying the main database. Indexing, may create structured references to data, enabling faster search and retrieval operations by reducing the amount of data that needs to be scanned. For example, if the adverse media screening system 102 frequently queries information about a high-profile entity, caching this data ensures rapid access for subsequent queries. These techniques may ensure that the adverse media screening system 102 can access relevant entity information swiftly, enhancing the overall performance and responsiveness of the system. These optimized data retrieval processes of the database access module 202 may help the adverse context modules 116 by providing timely and accurate data for entity resolution and sentiment analysis. The integration of the database access module 202 with the adverse context modules 116 may reduce latency, improve the efficiency of risk assessments, and ensure that compliance officers have access to the most current and relevant information for making informed decisions.

The entity recognition module 204 may use one or more NLP algorithms to scan a diverse array of digital media sources for mentions of entities. For example, the entity recognition module 204 may extract relevant information from unstructured text data, such as news articles, blog posts, and financial reports. By using named entity recognition and/or contextual analysis, the entity recognition module 204 may identify and categorize mentions of individuals and their associated roles within organizations, distinguishing relevant entity mentions from irrelevant ones.

In some embodiments, the entity recognition module 204 may use dependency parsing and/or semantic analysis to deeply understand the context within which entities are mentioned in various texts. These techniques allow the entity recognition module 204 to parse complex sentence structures and determine the relationships and roles associated with named entities. For example, if a text states "Jane Doe, serving as an advisor to XYZ Corporation," the entity recognition module 204 may use semantic analysis to recognize "Jane Doe" as an individual linked to "XYZ Corporation" with an "advisor" role. Dependency parsing may help map out the grammatical relationships in the sentence, confirming that "Jane Doe" is the subject connected to the action "serving," which directly relates to the entity "XYZ Corporation." This context-aware analysis ensures that each entity mention is understood in its correct relational and functional capacity, thereby enhancing the precision and relevance of the data extracted for use in the adverse media screening system 102.

Moreover, the entity recognition module 204 may be continuously updated with the latest developments in NLP technology, ensuring that it remains effective even as language use evolves. One or more machine learning models may be regularly trained on new datasets, encompassing emerging vocabularies, slang, and/or evolving language patterns captured from a broad spectrum of digital media sources, such as social media updates, news articles, and academic journals. For example, as new terms or organization names become prevalent in media discourse (e.g., newly formed NGOs or startups), the NLP models may be updated to recognize these terms accurately. This ongoing training process may include transfer learning, where a pre-trained model is fine-tuned with new data, thereby enabling the entity recognition module 204 to adapt to changes in language use without requiring a rebuild from scratch. This approach ensures that the entity recognition remains robust, reducing the risk of misidentifications and improving the reliability of data used for adverse media screening.

The sentiment indicator module 206 may analyze and determine the sentiment of mentions within the text of various forms of media. The sentiment indicator module 206 can use NLP techniques to evaluate the emotional tone of the text surrounding identified entities. The sentiment indicator module 206 can process the text to identify sentiment bearing words and phrases, such as "fraudulent" or "successful" and use predefined linguistic rules and machine learning algorithms to classify the sentiment as positive, neutral, or negative. The sentiment indicator module 206 can then assign a score to each mention. For example, the score can be on a scale (e.g., −1 to 1) where negative values indicate negative sentiment, positive values indicate positive sentiment, and values at zero indicate neutrality.

In some embodiments, the sentiment indicator module 206 can perform sentiment trend analysis. The sentiment trend analysis may involve tracking changes in sentiment over time for specific entities or topics. The sentiment indicator module 206 can analyze historical data to identify patterns and trends in sentiment, such as a gradual increase in negative sentiment surrounding a particular entity. This function can help the adverse media screening system 102 detect emerging risks and potential issues before they become critical. For example, if the sentiment indicator module 206 notices a consistent rise in negative sentiment about a company over several months, the sentiment indicator module 206 can flag this trend for further investigation. The alert may allow compliance officers to take proactive measures. The sentiment trend analysis may enhance the adverse media screening system's ability to monitor and respond to evolving risks, providing a more comprehensive and dynamic approach to adverse media screening.

The context indicator module 207 may determine the context in which mentions appear in various forms of media. The context indicator module 207 can use NLP techniques and/or text link analysis to analyze the surrounding text of each mention to understand the context of the text. The context indicator module 207 can parse the text and identify key phrases and linguistic patterns that indicate context. The context indicator module 207 can use machine learning algorithms to classify the context as positive, neutral, or negative based on predefined rules and learned patterns from historical data. The context indicator module 207 may examine the co-occurrence of words, sentence structure, and semantic relationships to discern whether the mention is related to adverse events, such as legal issues or negative news, or if it is benign. The context indicator module 207 can then assign a score to context of each mention. For example, the score can be on a scale (e.g., −1 to 1) where negative values indicate negative context, positive values indicate positive context, and values at zero indicate neutrality.

The context indicator module 207 may aid the sentiment indicator module 206 by providing a detailed understanding of the context in which sentiments are expressed using text link analysis. While the sentiment indicator module 206 may focus on determining the emotional tone (positive, negative, or neutral) of the text, the context indicator module 207 may ensure that this sentiment is interpreted correctly within its proper context. For example, a negative sentiment in a benign context may not be as critical as a negative sentiment in an adverse context. The text link analysis extraction may include constructing a network of text-based links that map, based on linguistic patterns and the proximity of terms, interrelations within the text between different entities and concepts. For example, if an individual's name appears frequently near terms such as "investigation" or "allegation," the text link analysis may flag the pattern as potentially adverse. The text link analysis may enhance the granularity of the screening process, enabling identification of direct mentions of entities in adverse contexts and/or inferring broader context-based associations that may indicate indirect risks. By working together, these modules may enhance the accuracy and reliability of the adverse media screening system 102, ensuring that compliance officers receive comprehensive and contextually relevant insights for effective risk management.

Moreover, a classification machine learning model may be utilized by the context indicator module 207 to optimize the effectiveness of one or more of the NLP and/or text link analysis models. The classification machine learning model may analyze the outcomes of the NLP and text linking to determine the efficacy of different linguistic rules and patterns in predicting adverse content. By training on datasets labeled with varying degrees of adverseness, the machine leaning model may learn to assign appropriate weights to different linguistic features and patterns, thereby refining the rule set. The classification machine learning model may continuously evaluate the performance of these rules against new data, adapting them to better address emerging language trends and terminologies found in adverse media. This ongoing learning and adaptation process may ensure that the system remains up-to-date and accurate in its ability to detect and analyze adverse media references, significantly enhancing the operational efficiency and reliability of the media screening process.

The data verification module 208 may provide a safeguard by verifying the accuracy and consistency of the information extracted by other modules of the one or more adverse context modules 116. Moreover, the data verification module 208 may use validation algorithms and heuristic checks to ensure data integrity by cross-referencing identified entities and their relationships against multiple trusted sources. For example, after entities and relationships are identified by the entity recognition module 204, the data verification module 208 may cross-references this information against multiple trusted sources such as official government registries, well-established news databases, and verified corporate disclosures. The entity recognition module 204 may detect discrepancies and inconsistencies by comparing the extracted data with authoritative records, ensuring that entity names, roles, and connections are accurately matched and up-to-date. Heuristic checks may include rules-based assessments that flag potential anomalies, such as an individual being listed in a role for a company from which they have publicly resigned. This verification process may prevent the propagation of errors and ensures that the outputs 114 remain reliable and trustworthy, significantly reducing the risk of decisions based on outdated or incorrect information.

The data verification module 208 may maintain and enhance the accuracy of the data within the database 110 by continuously monitoring and identifying discrepancies or anomalies in the entity data. In some embodiments, the data verification module 208 may systematically review entity information against updated external sources, such as business registries or news feeds, to detect and rectify inconsistencies. For example, if an entity is reported as dissolved in a government update but is still active in the database 110, the data verification module 208 may trigger a corrective action to align the database 110 with the most recent information. This proactive approach may ensure the integrity of the data used by the adverse media screening system 102. Moreover, the data verification module 208 may may use real-time data validation techniques, such as checksums or hash sums, to verify the correctness of data after each update, automatically correcting errors such as typographical mistakes or outdated entity statuses.

Furthermore, the data verification module 208 may use machine learning techniques to improve its error detection and correction capabilities over time. By analyzing patterns and outcomes from historical corrections and adjustments, the data verification module 208 may train its algorithms to better recognize and autonomously rectify frequent and recurring data inconsistencies. In real-time, the data verification module 208 can apply models to verify incoming data, detecting anomalies and flagging potential errors. Cross-referencing with multiple trusted sources, the data verification module 208 can identify discrepancies and use probabilistic methods for validation. Detected errors can be corrected using predefined rules and machine learning-based suggestions, with feedback incorporated into the training process for continuous improvement. For example, using a supervised learning approach, the data verification module 208 may be trained on a dataset comprising instances of common errors such as misclassified sentiment scores or incorrectly linked entity profiles, alongside corrected versions. Over time, the machine learning models may learn to predict these errors and suggest or automatically apply the most likely correction, thus increasing overall data accuracy and operational efficiency. The data verification module 208 may continuously update models with new data and feedback, adapting to emerging patterns and enhancing accuracy over time. This integration ensures that the adverse media screening system 102 may operate with accurate and trustworthy data, improving the efficiency and effectiveness of the adverse context modules 116 for precise and reliable risk assessments.

The alert generation module 210 may increase the responsiveness of the adverse media screening system 102 by providing real-time notifications about significant changes in the context, sentiment, and status of entities. The alert generation module 210 may continuously analyze incoming data streams, using natural language processing (NLP) and machine learning algorithms to evaluate sentiment and context, comparing these against predefined thresholds to trigger alerts when necessary. The alert generation module 210 may also monitor trends over time, detecting gradual changes that may indicate emerging risks. Additionally, the alert generation module 210 may actively track the statuses of entities recorded in database 110, synchronizing with the database 110 to detect significant changes in attributes such as legal status or affiliations. For example, if the alert generation module 210 detects a sudden spike in negative sentiment about a company due to a new fraud allegation, the module 210 will trigger an alert for compliance officers to investigate further. Similarly, if an entity's legal status changes from "active" to "under investigation," the module 210 may generate an alert to notify the relevant personnel. This proactive monitoring and alerting capability may enhance the system's overall effectiveness in maintaining accurate and up-to-date risk assessments.

Alerts generated by the alert generation module 210 may be configured to be both informative and actionable. The alerts may provide detailed information about the nature of the change and its potential implications, allowing compliance officers and risk managers to quickly assess the situation and decide on appropriate actions. The alerts may be formatted to include links to affected records, historical data comparisons, and/or determined risk assessment scores that quantify the urgency and impact of the change. Additionally, the alert generation module 210 may use customizable alert settings to tailor notifications according to user preferences and specific operational requirements. Users can define the criteria for triggering alerts, such as setting thresholds for sentiment scores or specifying particular entities or keywords to monitor. The alert generation module 210 may allow users to choose the types of alerts they wish to receive and the frequency of notifications. For example, a compliance officer may set up alerts to be notified immediately of any negative sentiment spikes related to high-risk entities, while another user may prefer daily summaries of status changes. These customizable settings ensure that the alerts are relevant and actionable, aligning with the specific needs and priorities of the users and enhancing the overall effectiveness of the adverse media screening system 102.

The query response module 212 may provide an interface for handling external inquiries related to specific entities or their interrelationships. When a query is received, the query response module 212 may access the database 110 to pull relevant information, e.g., including historical data, current statuses, and detailed profiles of entities. The query response module 212 may use indexing and/or search algorithms to expedite data retrieval and quickly provide comprehensive results. For example, if a compliance officer queries the involvement of a person in any NGO, the query response module 212 may search the entity data, compile a report detailing the individual's roles across various organizations over time, and present the report in a structured format (e.g., including timelines and/or relationship maps). Thereby, the query response module 212 may support rigorous compliance reviews and risk assessments by providing stakeholders with detailed, ready-to-analyze data, facilitating informed decision-making and thorough investigations.

The query response module 212 may utilize advanced search algorithms and query optimization techniques to ensure that responses are accurate and timely, minimizing wait times and maximizing the relevance of the information provided. For example, when processing a query about a specific person, the query response module 212 may use indexed keywords and relationship tags to pull relevant data in near real-time. Moreover, query optimization strategies such as caching frequently requested data and/or predictive analytics may be used to pre-fetch data based on common query patterns.

In some embodiments, the query response module 212 may use query tracking and data analytics to log and analyze each inquiry it processes. The data analytics may categorize queries by type, frequency, and complexity. For example, a compliance officer queries the system for information about "John Doe" to assess potential risks. The query response module 212 can log the query details and retrieve relevant data from database 110. The query response module 212 may then analyze the context and sentiment of the retrieved mentions of "John Doe," identifying any negative sentiment or adverse context. If the analysis reveals recent negative news articles linking "John Doe" to fraudulent activities, the query response module 212 may include this information in the response, highlighting the adverse context and sentiment. The query response module 212 may also track the query's performance, logging response time and user feedback, which are later analyzed to improve future query responses. This process ensures that the compliance officer receives timely and accurate information, enabling effective risk assessment and decision-making. This data may then be used to refine the query response module 212 by optimizing response strategies for common queries and adjusting resource allocation to handle high-demand periods more efficiently. Additionally, insights from query analytics may guide updates to the structure of the database 110 and/or refine screening algorithms to better match emerging compliance needs and industry trends, ensuring that the adverse media screening system 102 adapts to changing user requirements and maintains optimal performance.

The integration module 214 may provide seamless integration of the adverse context modules 116 with external compliance systems to create a unified and effective risk management framework. By ensuring coherent data flow and synchronization across various platforms, the integration module 214 may support a collaborative approach to compliance, where information and insights are shared efficiently across different parts of the organization. In some embodiments, the integration module 214 may use standardized APIs and/or data exchange protocols, such as RESTful APIs or SOAP, to transmit and receive data efficiently across different software platforms, allowing the integration module 214 to integrate with a wide range of databases and compliance tools regardless of their underlying technology. For example, the integration module 214 may connect with CRM (Customer Relationship Management) systems, financial tracking applications, or other regulatory compliance databases. By ensuring compatibility and simplifying the data sharing process, the integration module 214 may enhance the operational flexibility of the adverse media screening system 102, enabling organizations to consolidate and utilize diverse technological resources effectively, thereby optimizing their compliance and risk management strategies.

In some embodiments, the integration module 214 may use security features to protect data integrity and confidentiality during exchanges. The security features may include use of SSL/TLS encryption for data in transit to ensure that all data sent and received by the integration module 214 is encrypted and secure from interception. Moreover, the integration module 214 may use OAuth for secure, token-based user authentication to control access and ensure that only authorized users can interact with the adverse media screening system 102. In some embodiments, the integration module 214 may use data masking and/or anonymization to protect sensitive information, such as personal identifiers, from exposure even if the data is intercepted or improperly accessed. These security features may prevent data breaches, maintain regulatory compliance with laws such as GDPR or HIPAA, and protect organizations from potential legal consequences and reputational harm that could arise from data mishandling.

Figure 3:
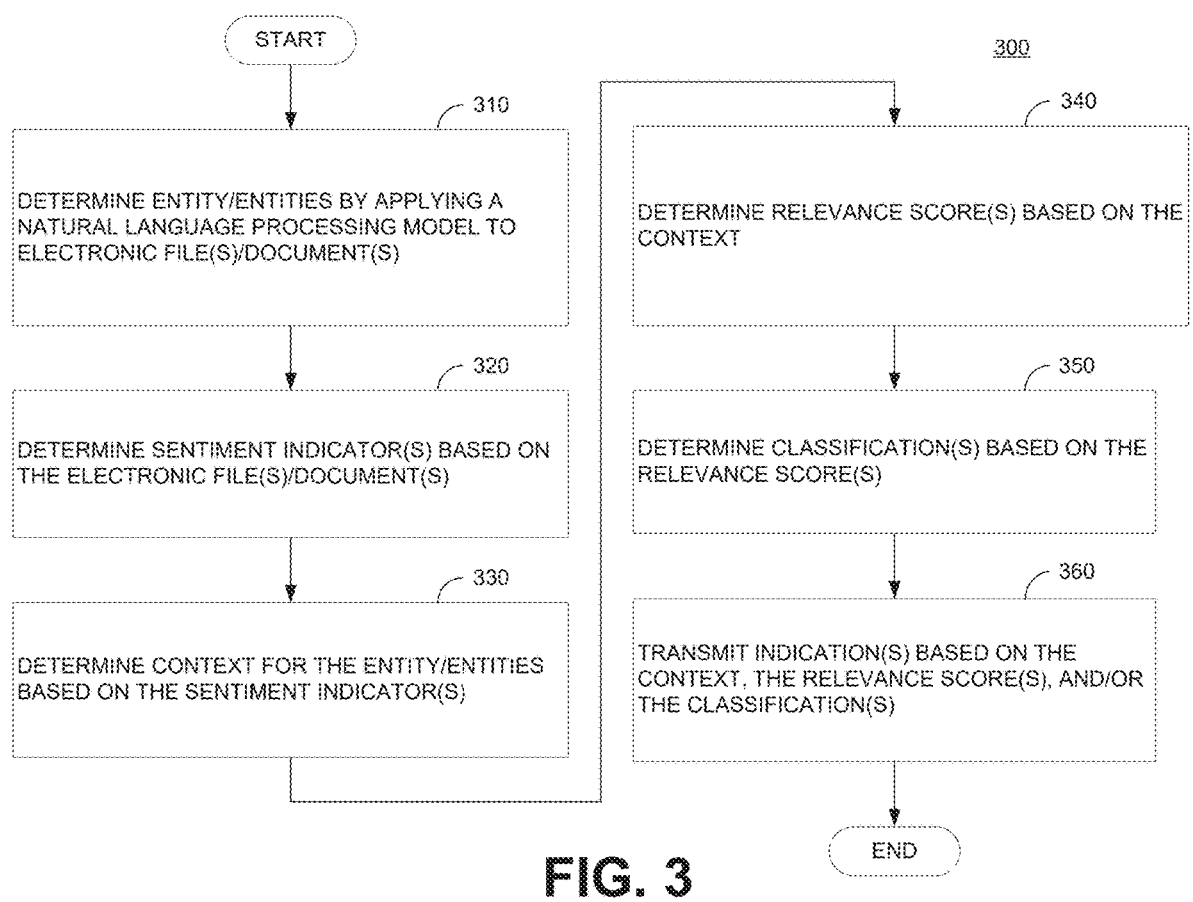
FIG. 3 illustrates an example of a process for adverse media screening.

Referring now to FIG. 3, illustrated is a flowchart of a process 300, according to an aspect of the disclosed systems and processes. The process 300 may demonstrate a comprehensive technique for identifying, analyzing, and categorizing entities and their associated sentiments within a network of unstructured and structured media sources. The process 300 may enable enhanced identification of adverse media content by systematically performing a series of actions, e.g., through the application of natural language processing and machine learning technologies.

At step 310, the process 300 may include determining a plurality of entities by applying a natural language processing (NLP) model to a plurality of electronic documents, wherein each entity of the plurality of entities is associated with at least one electronic document of the plurality of electronic documents. The electronic documents may comprise a broad range of digital formats including, but not limited to, files, data objects, web pages, emails, and multimedia content, thereby not restricting the plurality of electronic documents to traditional text documents alone. The NLP model may analyze a diverse array of electronic documents. For example, the documents may comprise one or more of online news articles, blog posts, corporate filings, social media content, and/or legal documents, as well as any other document associated with adverse media screening. The NLP model may perform complex text analysis, extracting meaningful information from unstructured text by recognizing and categorizing text-based data. One or more entities may be identified and extracted. The entities may comprise one or more specific nouns, such as the names of individuals (e.g., "John Smith"), organizations (e.g., "Acme Corp."), geographic locations (e.g., "New York City"), or other pertinent keywords (e.g., "money laundering," "fraud").

The NLP model may utilize advanced algorithms and linguistic databases to parse text, recognize patterns, and accurately identify these entities. The advanced algorithms and linguistic databases may enable the model to understand the context in which each entity is mentioned within the documents. For example, the NLP model may use tokenization to break down text into smaller parts, named entity recognition (NER) to classify segments of text into predefined categories, and/or dependency parsing to analyze grammatical structure of a sentence. For each entity identified, the NLP model may associate it with one or more electronic documents where the entity is referenced. This association may set forth a basis for subsequent steps where the context and sentiment surrounding each entity may be analyzed.

At step 320, the process 300 may include determining, for each entity of the plurality of entities and based on the at least one electronic document, one or more sentiment indicators. Sentiment indicators may be associated with the emotional tone and context in which the entities are referenced, assisting in discerning whether the mentions are positive, neutral, or negative. An NLP model may analyze the text surrounding each entity, and one or more algorithms may evaluate word choice, phrasing, and the proximity of specific adjectives or sentiment-laden expressions relative to the identified entities. A proximity (e.g., spatial closeness) may be determined to quantify spatial or sequential closeness of specific words or phrases (e.g., associated with a sentiment) to each entity within textual data of the at least one document. The proximity may be determined using NLP techniques (e.g., tokenization or parsing) to identify and quantify a distance between each entity and sentiment-laden words or phrases, thereby assessing the contextual sentiment around the entity (e.g., adverse mentions or concepts that are associated with the entities). For example, if an individual's name is mentioned in close proximity to words like 'scandal,' 'violation,' or 'convicted,' these terms may act as negative sentiment indicators. Conversely, words like 'award-winning,' 'partnership,' or 'innovation' may suggest a positive sentiment. As with other examples provided herein, these examples are intended for illustrative purposes only and should not be construed as limiting the scope of the disclosure.

The process of determining sentiment indicators may include training sentiment analysis models on large datasets of labeled text. The sentiment analysis models may be capable of recognizing and interpreting various emotional expressions and their intensities. These models may employ techniques such as machine learning classifiers or deep learning networks to understand nuances in language and even detect sarcasm or irony. Based on the identified sentiment indicators, a sentiment score may be determined for each named entity and each associated electronic document. The sentiment score may comprise an indication associated with a positive, neutral, or a negative sentiment, which may reflect the overall sentiment tone identified for each entity and document. The sentiment score may provide a nuanced understanding of how each entity is perceived in the public domain or specific contexts.

At step 330, the process 300 may include determining, for each entity of the plurality of entities and based on the one or more sentiment indicators, a context associated with the least one electronic document. For example, by comparing this sentiment score (e.g., determined through analysis of text surrounding the entity) to a predefined threshold, the process 300 may determine the contextual relevance of the reference to the entity. If the sentiment score surpasses a negative sentiment threshold in a document discussing financial irregularities, it may indicate an adverse context for a corporate entity, suggesting a potential risk factor for compliance assessments.

According to some aspects, process 300 may comprise trend analysis, e.g., tracking changes in sentiment over time across multiple documents. For instance, if a political figure's sentiment scores in media coverage deteriorate consistently before an election, it might indicate a negative public sentiment trend, providing context for the entity's changing perception. Moreover, process 300 may comprise cluster analysis (e.g., grouping entities with similar sentiment patterns) to identify broader trends or common themes in how certain types of entities are discussed. For example, if several tech companies are clustered together with positive sentiment scores associated with innovation and growth, the cluster may suggest a generally favorable industry context.

At step 340, the process 300 may include determining, for each entity of the plurality of entities and based on the context, a relevance score indicating an association with an adverse media context. The relevance score may quantitatively reflect the extent to which an entity is associated with potentially adverse media. The relevance score may be derived from analyzing the contextual nuances around each entity's mention, e.g., incorporating both the nature of the sentiment and the specific circumstances or topics discussed in proximity to the entity.

The relevance score may be calculated by integrating various contextual factors, such as the presence of legal, financial, or ethical issues linked directly or indirectly to the entity. The relevance score may be a composite measure that may range on a scale, for example, from 0 to 100, where higher scores indicate a stronger association with adverse media contexts. This scoring may allow compliance officers or risk managers to prioritize their focus on entities with high scores, which represent a higher risk, and monitor entities with lower scores less stringently, optimizing resource allocation and risk management efforts effectively.

The relevance score may be derived by evaluating the contextual nuances where the entity appears, such as the nature of the sentiment, the severity of the terms used, and/or the overall tone of the document segments where the entity is mentioned. For example, if an entity is frequently mentioned in contexts related to legal disputes, regulatory issues, or financial troubles in a manner that exceeds the negative sentiment threshold, the relevance score would reflect a strong association with adverse contexts. The relevance score may enable a more targeted approach in subsequent processes like compliance monitoring or risk assessment, by quantifying the potential impact of the adverse media on the entity's public perception or operational status.

According to some aspects, the determination of relevance scores at step 340 may include a sophisticated algorithm that considers the intensity and frequency of negative sentiment as well as the credibility and influence of the sources of information. By incorporating these factors, the process 300 may ensure that the relevance scores are both accurate and reflective of real-world implications. For instance, negative mentions in highly credible financial reports or major news outlets may be weighted more heavily than those in less reputable sources. Additionally, the process may integrate historical data to assess how the sentiment around an entity has evolved, providing a dynamic view of its risk profile. Moreover, the determination of the relevance score may be based on proximity (e.g., spatial closeness) of the entity to one or more keywords associated with negative sentiments. For example, a defined threshold may be set where the proximity of an entity to sentiment-laden keywords (e.g., quantified as being within a particular number of words or fewer) may strongly suggest relevance, thereby increasing the relevance score. The defined threshold may facilitate customization of the relevance assessment, enhancing the precision of adverse media context associations by taking into account the spatial closeness of keywords to the entity in the text.

At step 350, the process 300 may include determining, for each entity of the plurality of entities and based on the relevance score, a classification associated with the at least one electronic document. The process 300 may leverage the relevance scores to categorize documents in a way that aligns with their perceived level of risk or significance regarding adverse media. As another example, a document containing entities with high relevance scores (e.g., indicative of strong associations with adverse activities such as legal issues, regulatory non-compliance, or ethical breaches) might be classified under a "high risk" category. This classification may signal to compliance officers and risk analysts that the document requires immediate and thorough review.

According to some aspects, the process 300 may incorporate one or more machine learning models including decision trees or neural networks. One or more of these models may utilize relevance scores along with patterns or relationships within the data that may indicate subtler aspects of risk. For example, if an entity repeatedly appears in documents with a marginally high relevance score but is connected to high-risk industries or regions, the system might classify these documents as "moderate risk" due to the cumulative contextual risk factors. Conversely, documents featuring entities with low relevance scores might be classified as "low risk," suggesting that the content is less likely to impact the organization's risk profile significantly and may not require immediate attention.

The process 300 may set thresholds for relevance scores that correspond to different risk levels. The thresholds may be dynamically adjusted based on the organization's risk tolerance and the specific requirements of the regulatory environment in which it operates. Documents can then automatically sort into categories such as "critical," "high," "moderate," and "low" risk based on these thresholds. This automated categorization may streamline the workflow by allowing compliance and risk management teams to prioritize their review processes, focusing their resources on scrutinizing documents that pose the greatest potential threat and managing less critical documents accordingly.

At step 360, the process 300 may include transmitting, in response to a query comprising a first entity of the plurality of entities and based on one or more of the context, the relevance score, and the classification, an indication of the at least one electronic document associated with the first entity. The query may include the name of an entity such as an individual, a corporation, or any keyword of interest, the system processes this request by filtering through its indexed database of electronic documents. The query may be matched against the entities identified and analyzed in earlier stages of the process. All documents related to the queried entity may be retrieved and/or filtered, prioritizing them based on their relevance scores and classification.

For example, if a user queries "John Smith," the process 300 may search for the entity across its database and retrieve documents where "John Smith" is mentioned. If the earlier analysis assigned high relevance scores and classified these documents as "high risk" due to contexts involving financial irregularities or legal issues, the system may highlight these documents to the user. The output may include a summary of each relevant document, links to the full texts, and/or annotations highlighting the specific parts of the text that led to the high relevance score and risk classification. Moreover, the output may include the classification, relevance score, context, and/or sentiment indicators.

The indications of documents transmitted to the user may be structured to provide quick insights. They may include metadata such as the document title, publication date, source, a brief excerpt containing the entity mention, and a visual indicator of the risk level (e.g., color-coded tags). This output may enable users to quickly assess the importance and relevance of each document and decide on further actions, whether conducting a deeper review, monitoring the entity more closely, or disregarding it as a false positive. This level of detailed response, driven by sophisticated processing of context, relevance, and classification, may ensure that the adverse media screening process is both efficient and effective, directly addressing the user's specific informational needs.

Figure 4:
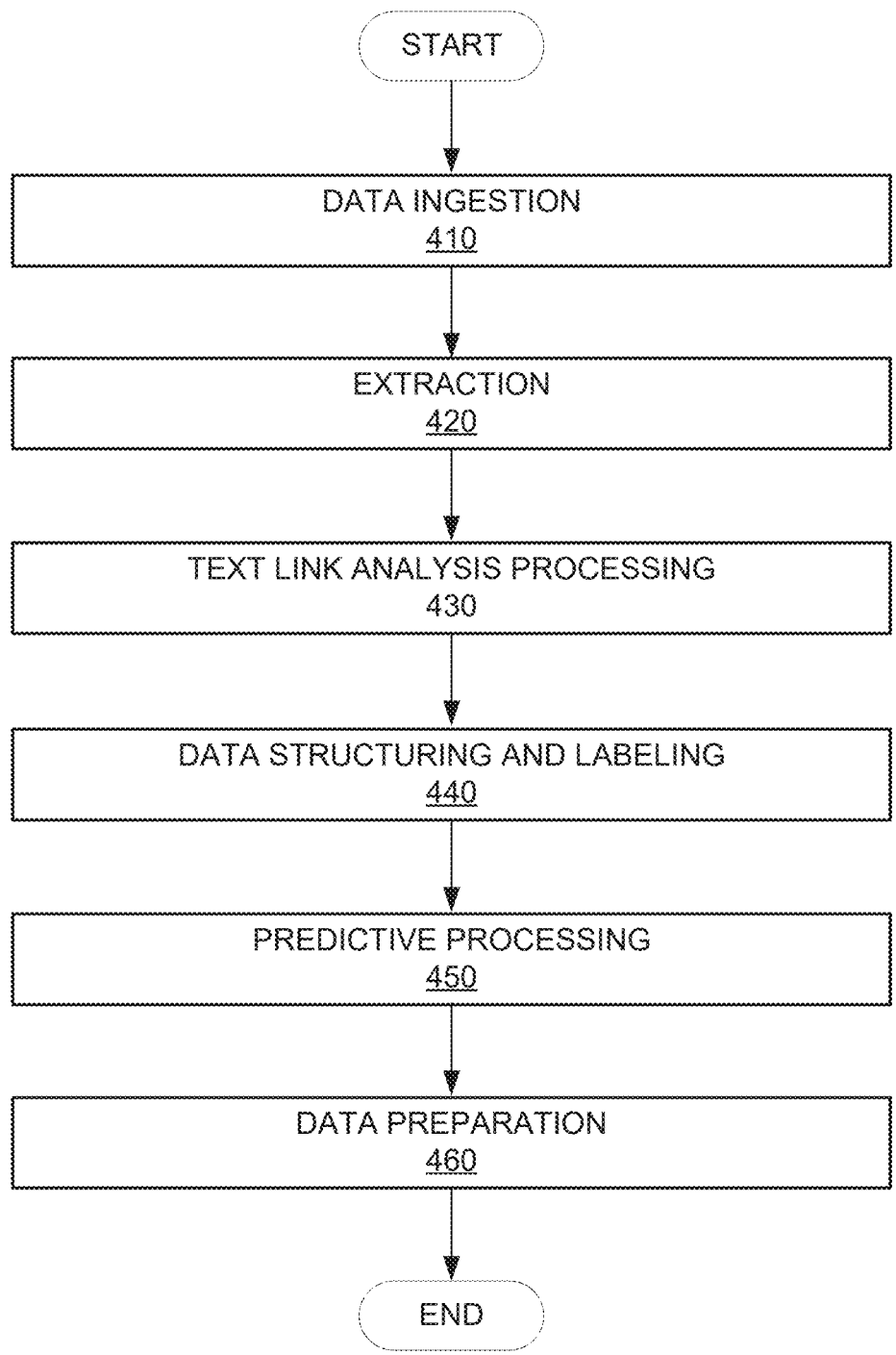
FIG. 4 illustrates an example of a process for contextualized entity extraction.

Referring now to FIG. 4, illustrated is a flowchart of a process 400, according to an aspect of the disclosed systems and processes. The process 400 may demonstrate a model for contextualized entity extraction designed to address a prevalent issue of false positives in conventional platforms associated with adverse media screening. False positives associated with conventional adverse media identification systems may primarily stem from the unstructured nature of data and the inadequacy of traditional technologies. According to some aspects, the process 400 may integrate advanced artificial intelligence (AI) technologies with machine learning and predictive analytics, thereby enhancing the model's ability to discern contextual relevance of information within articles accurately. This integration may lead to a substantial reduction in false positives (e.g., relative to conventional adverse media identification systems) by refining the model's ability to understand whether an article genuinely pertains to adverse media based on its content context.

Conventional adverse media identification systems may erroneously flag articles as adverse due to the presence of certain keywords or phrases associated with negative events, even if the entities mentioned are discussed in a non-negative light. An article associated with a specific person may be flagged by conventional adverse media identification systems as an adverse media article even though the specific person in the article may not be mentioned paired with any crime or concepts that would be considered adverse media. For example, an article about organized crime in Europe may mention a conventionally "good" person, such as Mother Theresa, as a person that spent their life trying to help combat organized crime. The article may mention several crimes committed by members of the mafia and thus, the article itself would be considered adverse media by conventional adverse media identification systems. Conventional adverse media identification systems fail to consider the context (e.g., that there were not any adverse events, news, or crimes associated with Mother Theresa) and may erroneously return the example article as "negative" for Mother Theresa.

According to some aspects, the model demonstrated by process 400 may refine the contextualization of adverse media relative to specific entities mentioned within the articles. For example, the model may analyze the context in which each entity is mentioned. This context analysis may ensure search and screening processes only return articles where the mentioned entities are directly linked to adverse activities, thereby eliminating irrelevant articles that could lead to false positive results.

The model demonstrated by process 400 may not only identify entities, but also extract and analyze the context of their mentions within the articles. For instance, if an article discusses John Smith but in capacities unrelated to any adverse actions, such as being a judge in a legal case, the process 400 may differentiate and exclude such contexts from being flagged as adverse. Relative to conventional adverse media identification systems, this capability may reduce false positives and ensure that searches yield more precise and relevant results. These distinctions are crucial for maintaining the integrity of data used in risk assessments and compliance checks, where accuracy is paramount.

In addition to extracting entities and their contexts, the model demonstrated by process 400 may capture data such as locations, ages, nationalities, and titles from the articles. This data may aid in building detailed profiles that may be used for deeper validation and assessment. By improving the methodologies and technologies employed for adverse media screening, the model demonstrated by process 400 may provide significant advancements in adverse media screening. These advancements set forth by process 400 may result in not only streamlining conventional processes for adverse media identification, but also equipping users with more reliable and actionable insights, thereby supporting more informed decision-making in various compliance and regulatory environments.

At step 410, the process 400 may include data ingestion, where news articles may be continuously aggregated and loaded into an SQL database as part of an ongoing process where sources are routinely scraped for the latest content. The data ingestion may ensure that the data stream remains robust and current, capturing a wide array of articles that may contain relevant adverse media information. The collected data may be accumulated and actively managed. Once the articles are in the SQL database, a Contextualized Entity Extraction (CEE) model may be directed to pull these datasets into the processing stream. The collected articles may be fed into a source node of the model, which may serve as an entry point for further analytical processing.

In addition to collection and allocation, step 410 may include initial data preparations and transformations. The initial data preparations and transformations may adjust the raw data into a format that is optimized for analysis and processing in later stages of the model. The transformations may include cleansing the data of any irrelevant or redundant information, standardizing formats to ensure consistency across data types, and/or preparing the text for nuanced analytical tasks that follow in the model's pipeline.

The data ingestion may set the stage for sophisticated operations of process 400. By ensuring that data enters the model efficiently and is immediately prepped for advanced processing, step 410 supports the overall effectiveness and accuracy of the entity extraction and contextual analysis performed by subsequent components of the system. This structured approach to data ingestion not only enhances the flow of information through the model but also significantly contributes to the reduction of false positives in identifying adverse media content.

At step 420, process 400 may extract linguistics. For example, the process 400 may utilize a software platform, such as IBM® SPSS® Modeler Text Analytics, for linguistics-based text analysis. Step 420 may combine statistical approaches with enhanced accuracy and minimal human intervention. Moreover, at step 420, source data may undergo conversion to a standardized format for ensuring consistency across data inputs and facilitating subsequent analytical processes.

Embodiments of extraction processes 420 may include identification of candidate terms from the text. These terms may be used for understanding the context and relevance of the content within the articles (e.g., adverse mentions or concepts that are associated with the entities). One or more models (e.g., an AI model) may identify equivalence classes and integrate synonyms, which may broaden a scope of the search terms and refine the data inputs for more accurate analysis. Further, each identified term may be assigned a type based on predefined categories in the custom taxonomy, and the data may be indexed to facilitate quick retrieval and analysis.

A custom taxonomy and dictionary may be associated with the extraction process 420. The taxonomy may be tailored to meet the specific needs of adverse media detection and contextual analysis. A custom linguistic library may define types and keywords for distinguishing between different entities and sentiments within the text. These definitions may accurately classify and extract relevant information based on the content's context and implied meaning.

Moreover, step 420 may allow for the incorporation of pattern matching with a secondary analyzer when necessary, enhancing the depth of analysis and the precision of the outputs. This sophisticated taxonomy and dictionary setup may not only improve the extraction accuracy but also support ongoing updates and modifications, ensuring the model remains effective in handling emerging trends and patterns in adverse media reporting. The continued refinement and expansion of this taxonomy may provide an evolving structure, thereby providing clarity on how the model adapts to new data and scenarios.

At step 430, the process 400 may include text link analysis processing. The text link analysis processing may incorporate advanced pattern-matching. The pattern-matching technology may recognize and establish relationships between the various concepts extracted from the textual data, aligning them with known patterns. Custom pattern-matching rules may suit the particular requirements of adverse media analysis, ensuring that the model can precisely identify and link relevant data points within the extensive textual datasets.

Moreover, step 430 may utilize the taxonomy developed during the extraction phase. For example, by utilizing the predefined categories and types from the custom taxonomy, step 430 may enhance the model's ability to classify and interlink extracted data effectively. The custom pattern-matching rules may utilize the taxonomy to identify specific types and concepts within the text, which may provide enhanced understanding of the context and implications of the entities mentioned in the adverse media content. This nuanced analysis may not only identify entities but may contextualize the entities within the broader spectrum of data, thereby increasing the accuracy and relevance of the output.

Furthermore, step 430 may provide a seamless transition from extracting to linking text data, handling complex data structures and relationships inherent in unstructured media content. The application of the text linking rules may enable the model to distinguish between mere mentions of entities and those significantly associated with adverse contexts. A user interface may illustrate formulation of text linking rules, as well as testing in conjunction with extraction. The user interface may provide a visual representation of the process 400, facilitating fine-tuning of the model's analytical capabilities. For example, the visual interface may facilitate simulation of various scenarios, allowing users to iteratively adjust and optimize the pattern-matching rules to enhance the model's effectiveness and adaptability in real-world applications.

At step 440, the process 400 may include data structuring and labeling. Step 440 may serve as a crucial phase where the model may transition from analysis to the preparation of actionable data. Step 440 may include a comprehensive processing of the extracted data, where entities and relevant artifacts may be identified and categorized according to their significance and context. Step 440 may target entities associated with adverse sentiment, e.g., those mentioned in contexts that may imply negative connotations such as legal issues, controversies, or negative publicity. The entities and their corresponding details may be meticulously organized, labeled according to the predefined categories derived from the custom taxonomy, and then seamlessly merged into a composite dataset.

This composite dataset may consolidate all relevant information into a unified structure, making it easier to handle and analyze in subsequent steps. The unified structure may include a variety of key fields such as entity names, context, and the nature of their mention, which may facilitate accurate classification and analysis in later stages. Following the structuring and labeling, the data may undergo a deduplication process. This process may ensure the uniqueness of each record in the dataset, eliminating any redundancies or duplications that could skew the results or lead to inaccuracies in the predictive analysis phase.

The deduplication process in step 440 may also enhance the overall quality of the dataset. By creating distinct records based on one or more fields (e.g., Capture ID and other fields), the model may ensure that each piece of data is unique and representative of a specific instance or mention. The integrity of the data may be maintained, and the reliability of subsequent analyses may be ensured, as each record may accurately reflect a unique entity or event for precise risk assessment and decision-making.

Once the data is structured, labeled, and deduplicated, it may be forwarded to a predictive model node, facilitating application of advanced analytics to predict the correctness and relevance of the classified data, e.g., determining the efficacy of the contextual entity extraction process. The predictive model may utilize the clean, organized dataset to perform assessments that predict potential risks or relevance with a high degree of accuracy and enhancing the utility and actionable insights derived from the model.

At step 450, the process 400 may include predictive processing. A classification model may evaluate the accuracy and reliability of the data structured in the previous steps. Step 450 may enhance the overall efficacy of the contextual entity extraction model by minimizing false positives and ensuring that entities related to adverse media are identified with precision. The model may employ an advanced Exhaustive Chi-squared Automatic Interaction Detection (CHAID) algorithm to meticulously analyze the interactions and dependencies between variables in the dataset. This sophisticated analysis may facilitate accurately predicting the relevance and correctness of the entity classifications based on the presence of adverse media contexts.

Moreover, to boost the predictive power and refine the accuracy of the model, boosting techniques may be integrated into the process. The boosting techniques may facilitate adjusting the weights of instances in the data that are misclassified, thereby incrementally improving the model's ability to classify entities correctly. This iterative refinement may be utilized for handling complex data scenarios and may ensure that the predictive model may adapt to nuances and variations in the data, enhancing its robustness and reliability.

Moreover, step 450 may include a rigorous validation process where a large set of extracted entities and articles are manually scored to assess the correctness of the output. This manual scoring may aid in calibrating the model and adjusting it to the specific characteristics of adverse media contexts. Furthermore, the manual scoring may allow the model to differentiate effectively between entities directly involved in adverse activities and those incidentally mentioned, thereby avoiding the inclusion of non-relevant entities such as victims or unrelated individuals. This calibration may result in high accuracy and reliability in the model's predictions.

A confidence score may be determined for each entity, indicating whether the data should progress to the final stages of processing. The confidence score may be derived from the combined use of the CHAID algorithm and boosting techniques, providing a robust measure of prediction accuracy. In some examples, a high accuracy rate (e.g., 97% accuracy) may be attained with training sets, demonstrating capabilities of the model to effectively predict the correct entities. This accuracy may ensure that only the most relevant and accurately classified data is forwarded for final processing and tagging in step 460. Moreover, this level of accuracy may underscore the model's advanced capabilities in refining the contextual entity extraction process, making it a transformative tool in the field of adverse media analysis.

At step 460, the process 400 may perform data preparation and tagging, ensuring that each piece of data is meticulously prepared and correctly categorized before it enters the final output stage. Step 460 may include a thorough review and adjustment of the data to make sure it aligns with the expected formats and standards, crucial for subsequent analysis and integration. According to some aspects, quality assurance may include tagging each captured identifier as processed, marking the identifiers as ready for inclusion in an output database. This tagging may aid in tracking the processing status and may maintain the integrity and traceability of the data.

Additionally, a filtering process may associate entities with types of organizations that are predetermined to be excluded from analysis and the excluded entities may be systematically removed from the final dataset. This exclusion may be based on a curated list of organization types which might not be relevant to the adverse media screening goals, such as certain non-profit organizations or government bodies. For example, the entities may be compared against a cross-reference table, and any matches may be excluded from the output to refine the data further and ensure that only pertinent information is retained. Step 460 may increase the effectiveness of the model by integrating and automating the entire flow of data from ingestion to output. The structured data may be stored in an output table that captures all the processed articles and ensures that no data is overlooked, maintaining the continuity and completeness of the data analysis process.

According to some aspects, the model's automation may be programmed to operate continuously, facilitating an ongoing and systematic update of the database. Moreover, step 460 may increase the model's robustness and ability to handle vast volumes of data efficiently. By ensuring that all data is correctly prepared, tagged, and filtered, step 460 may support the overall objective of reducing false positives and enhancing the precision of adverse media screening.

As described, each step in FIG. 4 may be interconnected, demonstrating a seamless flow from data capture to processing and output, highlighting the model's capability to handle large volumes of data while maintaining precision in contextual entity extraction.

Figure 5:
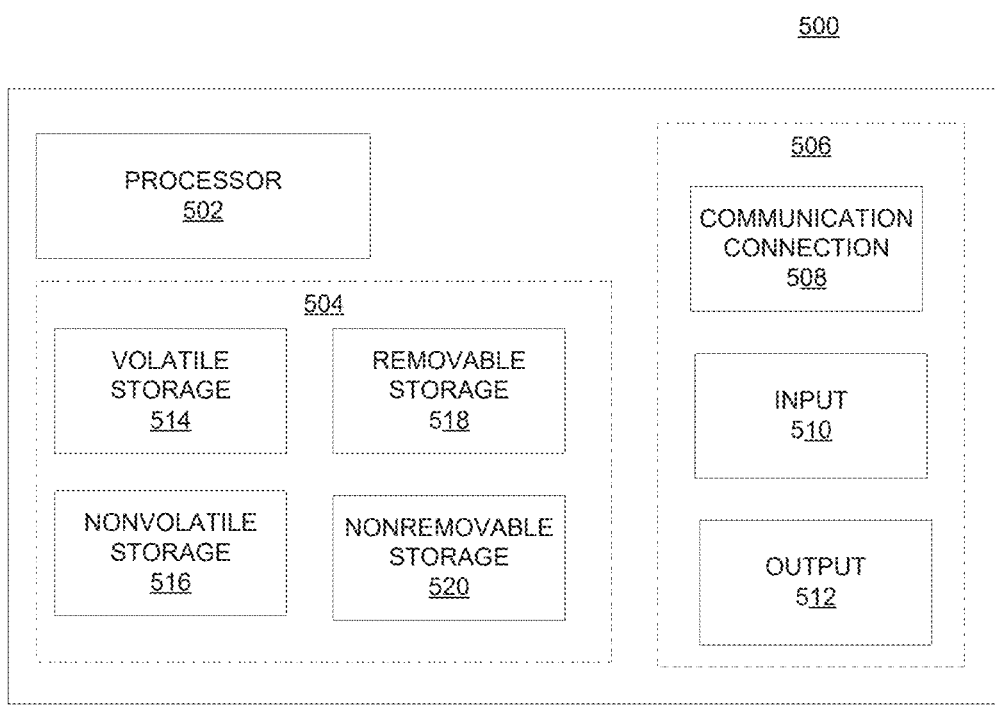
FIG. 5 illustrates a schematic of an example of an adverse media screening device.

FIG. 5 is a block diagram of a computing device 500 that may be connected to or comprise a component of adverse media screening system 102. Computing device 500 may comprise hardware or a combination of hardware and software. The functionality to facilitate adverse media screening may reside in one or a combination of computing devices 500. Computing device 500 depicted in FIG. 5 may represent or perform functionality of an appropriate computing device 500, or a combination of computing devices 500, such as, for example, a component or various components of an adverse media screening system, a computing device, a processor, a server, a gateway, a database, a firewall, a router, a switch, a modem, an encryption tool, a virtual private network (VPN), or the like, or any appropriate combination thereof. It is emphasized that the block diagram depicted in FIG. 5 is an example and is not intended to imply a limitation to a specific example or configuration. Thus, computing device 500 may be implemented in a single device or multiple devices (e.g., single server or multiple servers, single gateway or multiple gateways, single controller, or multiple controllers). Multiple network entities may be distributed or centrally located. Multiple network entities may communicate wirelessly, via hard wire, or any appropriate combination thereof.

Embodiments of the computing device 500 may comprise a processor 502 and a memory 504 coupled to processor 502. The memory 504 may contain executable instructions that, when executed by the processor 502, may cause the processor 502 to effectuate operations associated with mitigating adverse media screening. As evident from the description herein, the computing device 500 is not to be construed as software per se.

In addition to a processor 502 and memory 504, a computing device 500 may include an input/output system 506. The processor 502, memory 504, and input/output system 506 may be coupled together (coupling not shown in FIG. 5) to allow communications between them. Each portion of the computing device 500 may comprise circuitry for performing functions associated with each respective portion. Thus, each portion may comprise hardware, or a combination of hardware and software. Accordingly, each portion of a computing device 500 is not to be construed as software per se. An input/output system 506 may be capable of receiving or providing information from or to a communications device or other network entities configured for adverse media screening. For example, the input/output system 506 may include a wireless communication (e.g., 3G/4G/5G/GPS) card. The input/output system 506 may be capable of receiving or sending video information, audio information, control information, image information, data, or any combination thereof. Input/output system 506 may be capable of transferring information with the computing device 500. In various configurations, the input/output system 506 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, the input/output system 506 may comprise a Wi-Fi finder, a two-way GPS chipset or equivalent, or the like, or a combination thereof.

Embodiments of the input/output system 506 of a computing device 500 also may contain a communication connection 508 that allows the computing device 500 to communicate with other devices, network entities, or the like. The communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. The input/output system 506 also may include an input device 510 such as keyboard, mouse, pen, voice input device, or touch input device. The input/output system 506 may also include an output device 512, such as a display, speakers, or a printer.

Embodiments of the processor 502 may be capable of performing functions associated with adverse media screening, such as functions for automatically processing and analyzing vast amounts of unstructured data to provide accurate, contextually relevant adverse media screening, as described herein. For example, a processor 502 may be capable of, in conjunction with any other portion of the computing device 500, contextualized entity resolution and sentiment analysis in adverse media screening, as described herein.

Embodiments of a memory 504 of the computing device 500 may comprise a storage medium having a concrete, tangible, physical structure. As is known, a signal does not have a concrete, tangible, physical structure. The memory 504, as well as any computer-readable storage medium described herein, is not to be construed as a signal. The memory 504, as well as any computer-readable storage medium described herein, is not to be construed as a transient signal. The memory 504, as well as any computer-readable storage medium described herein, is not to be construed as a propagating signal. The memory 504, as well as any computer-readable storage medium described herein, is to be construed as an article of manufacture.

The memory 504 may store any information utilized in conjunction with adverse media screening. Depending upon the exact configuration or type of processor, a memory 504 may include a volatile storage 514 (such as some types of RAM), a nonvolatile storage 516 (such as ROM, flash memory), or a combination thereof. The memory 504 may include additional storage (e.g., a removable storage 518 or a non-removable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by a computing device 500. The memory 504 may comprise executable instructions that, when executed by a processor 502, cause the processor 502 to effectuate operations associated with adverse media screening.

Figure 6:
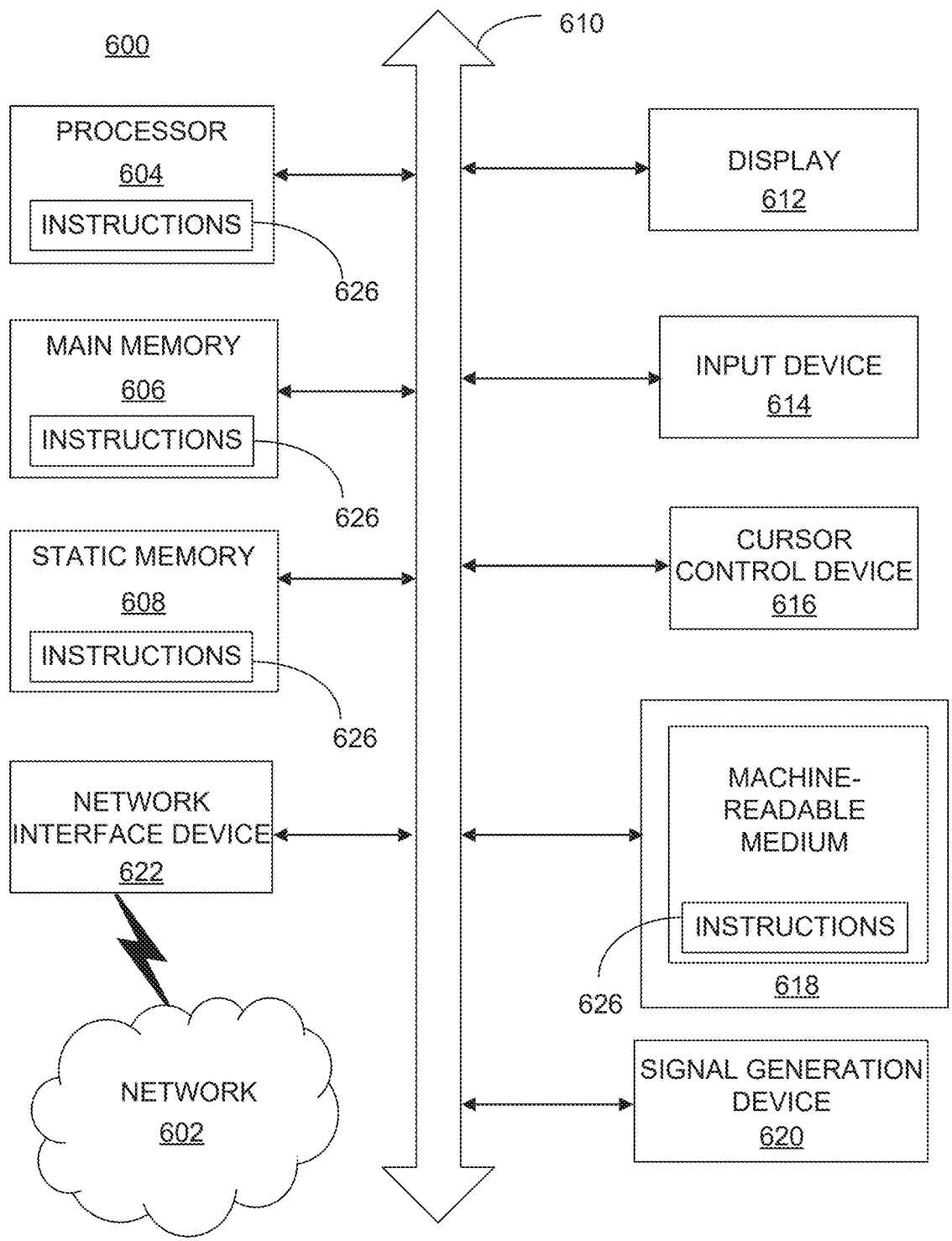
FIG. 6 illustrates an example diagrammatic representation of a machine in the form of a computer system.

FIG. 6 depicts an example of a diagrammatic representation of a machine in the form of a computer system 600 within which a set of instructions, when executed, may cause the machine to perform any one or more of the methods described above. One or more instances of the machine can operate, for example, as computing device 600, processor 604, adverse media screening system 102, computing devices 104, server 108, database 110, and other devices of FIGS. 1-5. In some examples, the machine may be connected (e.g., using a network 602) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

A computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid-state display). The computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the examples described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium on which is stored one or more sets of instructions (e.g., instructions 626) embodying any one or more of the methods or functions described herein, including those methods illustrated above. Instructions 626 may also reside, completely or at least partially, within the main memory 606, the static memory 608, or within the processor 604 during execution thereof by the computer system 600. The main memory 606 and the processor 604 also may constitute tangible computer-readable storage media.

While examples of a system for adverse media screening have been described in connection with various computing devices/processors, the underlying concepts may be applied to any computing device, processor, or system capable of facilitating an adverse media screening system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for adverse media screening. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with an adverse media screening system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for adverse media screening as described herein. When implemented on a general-purpose processor, the program code combines with the processor to provide a unique device that operates to invoke the functionality of an adverse media screening system.

While the disclosed systems have been described in connection with the various examples of the various figures, it is to be understood that other similar implementations may be used, or modifications and additions may be made to the described examples of an adverse media screening system without deviating therefrom. For example, one skilled in the art will recognize that an adverse media screening system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—automatically processing and analyzing vast amounts of unstructured data to provide accurate, contextually relevant adverse media screening—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed:

1. One or more computing devices, comprising one or more processors, configured to:
   receive, from a plurality of media sources, a plurality of electronic documents;
   determine a plurality of entities by applying a natural language processing (NLP) model to the plurality of electronic documents, wherein each entity of the plurality of entities is associated with at least one electronic document of the plurality of electronic documents;
   determine, for each entity of the plurality of entities and based on the at least one electronic document, one or more sentiment indicators;
   determine, for each entity of the plurality of entities and based on the one or more sentiment indicators, a context associated with the least one electronic document;
   determine, for each entity of the plurality of entities and based on the context, a relevance score indicating an association with an adverse media context;
   determine, for each entity of the plurality of entities and based on the relevance score, a classification associated with the at least one electronic document; and
   transmit, in response to a query comprising a first entity of the plurality of entities and based on one or more of the context, the relevance score, and the classification, an indication of the at least one electronic document associated with the first entity.

2. The one or more computing devices of claim 1, wherein the one or more computing devices are further configured to transmit in response to the query, the relevance score associated with the first entity.

3. The one or more computing devices of claim 1, wherein the plurality of electronic documents comprise unstructured text data.

4. The one or more computing devices of claim 1, wherein the one or more processors are further configured to identify adverse mentions or concepts associated with the entities, wherein the one or more sentiment indicators or the context are determined based on the adverse mentions or concepts.

5. The one or more computing devices of claim 1, wherein the one or more processors are further configured to identify, based on text linking or linguistic patterns, one or more key concepts associated with one or more of the plurality of entities, wherein the one or more sentiment indicators are determined based on the one or more key concepts.

6. The one or more computing devices of claim 5, wherein the text linking or linguistic patterns are associated with linguistic rules and wherein the linguistic rules are determined by a classification machine learning model.

7. The one or more computing devices of claim 1, wherein the one or more computing devices are further configured to determine, based on the one or more sentiment indicators, a sentiment score associated with each named entity and each associated electronic document, wherein the context is determined based on a comparison of the sentiment score with a sentiment threshold.

8. The one or more computing devices of claim 7, wherein the sentiment score comprises an indication associated with a positive sentiment, a neutral sentiment, or a negative sentiment.

9. The one or more computing devices of claim 1, wherein the classification is determined based on a machine learning model trained on a dataset labeled for entity relevance to adverse media concepts.

10. The one or more computing devices of claim 1, wherein a database comprises the at least one electronic document and the indication of the at least one electronic document associated with the first entity is transmitted based on searching the database.

11. A method performed by one or more computing devices, the method comprising:
    determining a plurality of entities by applying a natural language processing (NLP) model to a plurality of electronic documents, wherein each entity of the plurality of entities is associated with at least one electronic document of the plurality of electronic documents;
    determining, for each entity of the plurality of entities and based on the at least one electronic document, one or more sentiment indicators;
    determining, for each entity of the plurality of entities and based on the one or more sentiment indicators, a context associated with the at least one electronic document;
    determining, for each entity of the plurality of entities and based on the context, a relevance score indicating an association with an adverse media context;
    determining, for each entity of the plurality of entities and based on the relevance score, a classification associated with the at least one electronic document; and
    transmitting, in response to a query comprising a first entity of the plurality of entities and based on one or more of the context, the relevance score, and the classification, an indication of the at least one electronic document associated with the first entity.

12. The method of claim 11, wherein the one or more computing devices are further configured to transmit in response to the query, the relevance score associated with the first entity.

13. The method of claim 11, wherein the plurality of electronic documents comprise unstructured text data.

14. The method of claim 11, further comprising identifying adverse mentions or concepts associated with the entities, wherein the one or more sentiment indicators or the context are determined based on the adverse mentions or concepts.

15. The method of claim 11, further comprising identifying, based on text linking or linguistic patterns, one or more key concepts associated with one or more of the plurality of entities, wherein the one or more sentiment indicators are determined based on the one or more key concepts.

16. The method of claim 15, wherein the text linking or linguistic patterns are associated with linguistic rules and wherein the linguistic rules are determined by a classification machine learning model.

17. The method of claim 11, further comprising determining, based on the one or more sentiment indicators, a sentiment score associated with each named entity and each associated electronic document, wherein the context is determined based on a comparison of the sentiment score with a sentiment threshold.

18. The method of claim 17, wherein the sentiment score comprises an indication associated with a positive sentiment, a neutral sentiment, or a negative sentiment.

19. The method of claim 11, wherein the classification is determined based on a machine learning model trained on a dataset labeled for entity relevance to adverse media concepts.

20. A system comprising:
one or more processors; and
memory coupled with the one or more processors, the memory storing executable instructions that when executed by the one or more processors cause the one or more processors to effectuate operations comprising:
determining a plurality of entities by applying a natural language processing (NLP) model to a plurality of electronic documents, wherein each entity of the plurality of entities is associated with at least one electronic document of the plurality of electronic documents;
determining, for each entity of the plurality of entities and based on the at least one electronic document, one or more sentiment indicators;
determining, for each entity of the plurality of entities and based on the one or more sentiment indicators, a context associated with the least one electronic document;
determining, for each entity of the plurality of entities and based on the context, a relevance score indicating an association with an adverse media context;
determining, for each entity of the plurality of entities and based on the relevance score, a classification associated with the at least one electronic document; and
transmitting, in response to a query comprising a first entity of the plurality of entities and based on one or more of the context, the relevance score, and the classification, an indication of the at least one electronic document associated with the first entity.

* * * * *